United States Patent
Yang et al.

(10) Patent No.: US 10,317,298 B2
(45) Date of Patent: Jun. 11, 2019

(54) APPARATUS AND METHOD FOR MEASURING RESIDUAL TORSIONS ON AN ELONGATED ELEMENT

(71) Applicant: NV Bekaert SA, Zwevegem (BE)

(72) Inventors: Tiehong Yang, Jiangsu (CN); Zhigao Yu, Jiangsu (CN); Liu Zhou, Jiangsu (CN); Lei Gu, Jiangsu (CN); Wei Shen, Jiangsu (CN); Bart Vanlandeghem, Kruishoutem (BE); Tom Gommers, Ghent (BE); Erwin Vereecken, Kalken (BE); Ghislain Doornaert, OSA Peninsula (CR)

(73) Assignee: NV BEKAERT SA, Zwevegem (BE)

( * ) Notice: Subject to any disclaimer, the term of this patent is extended or adjusted under 35 U.S.C. 154(b) by 57 days.

(21) Appl. No.: 15/325,622

(22) PCT Filed: Jul. 2, 2015

(86) PCT No.: PCT/EP2015/065103
§ 371 (c)(1),
(2) Date: Jan. 11, 2017

(87) PCT Pub. No.: WO2016/034306
PCT Pub. Date: Mar. 10, 2016

(65) Prior Publication Data
US 2017/0191887 A1    Jul. 6, 2017

(30) Foreign Application Priority Data

Sep. 2, 2014 (WO) ................ PCT/CN2014/085699

(51) Int. Cl.
*G01L 5/00* (2006.01)
*G01L 5/10* (2006.01)

(52) U.S. Cl.
CPC ............ *G01L 5/0047* (2013.01); *G01L 5/108* (2013.01)

(58) Field of Classification Search
CPC ..... G01L 3/1457; G01L 5/0047; G01L 5/108; G01L 3/104; D07B 7/00; D07B 7/02; G01N 3/08; G01N 3/26; G05B 19/05
(Continued)

(56) References Cited

U.S. PATENT DOCUMENTS 3,679,808 A * 7/1972 Rohner ................ B65H 59/40
                                                73/862.46
4,365,519 A * 12/1982 Hietaranta ............... G01L 1/04
                                                73/862.52
(Continued)

FOREIGN PATENT DOCUMENTS

CN    205826186    * 12/2016
JP    S55153633    * 11/1980

OTHER PUBLICATIONS

International Search Report dated Sep. 21, 2015 in International (PCT) Application No. PCT/EP2015/065103.

*Primary Examiner* — Octavia Hollington
(74) *Attorney, Agent, or Firm* — Wenderoth, Lind & Ponack, L.L.P.

(57) ABSTRACT

An apparatus (100, 200, 300) and a method for measuring residual torsions of an elongated structure (202) such as a steel cord use a pivot head (102). The pivot head (102) comprises a wheel (104) adapted to guide an elongated structure (202). The wheel (104) is mounted in the pivot head (102) to transmit torques exercised by the elongated structure (202) on the wheel (104) to the pivot head (102). The pivot head (102) is mounted along a pivotal axis (110). This pivotal axis (110) lies in a plane of the wheel (104) and comprises the center of the wheel (104). Sensors (116, 206) measure the torque on the pivot head (102). The pivotal
(Continued)

movement of the pivot head (102) around the pivotal axis (110) is limited to an angle range of ±5°, preferably ±3° in order to reach an improved accuracy of the torque measurement.

15 Claims, 2 Drawing Sheets

(58) Field of Classification Search
USPC .................................................... 73/862.191
See application file for complete search history.

(56) References Cited

U.S. PATENT DOCUMENTS

| | | | | |
|---|---|---|---|---|
| 4,561,580 A | * | 12/1985 | Trail, Jr. | B65H 23/044 |
| | | | | 226/45 |
| 4,590,752 A | * | 5/1986 | Aubert | B21C 37/124 |
| | | | | 140/149 |
| 4,642,979 A | | 2/1987 | Tomioka et al. | |

\* cited by examiner

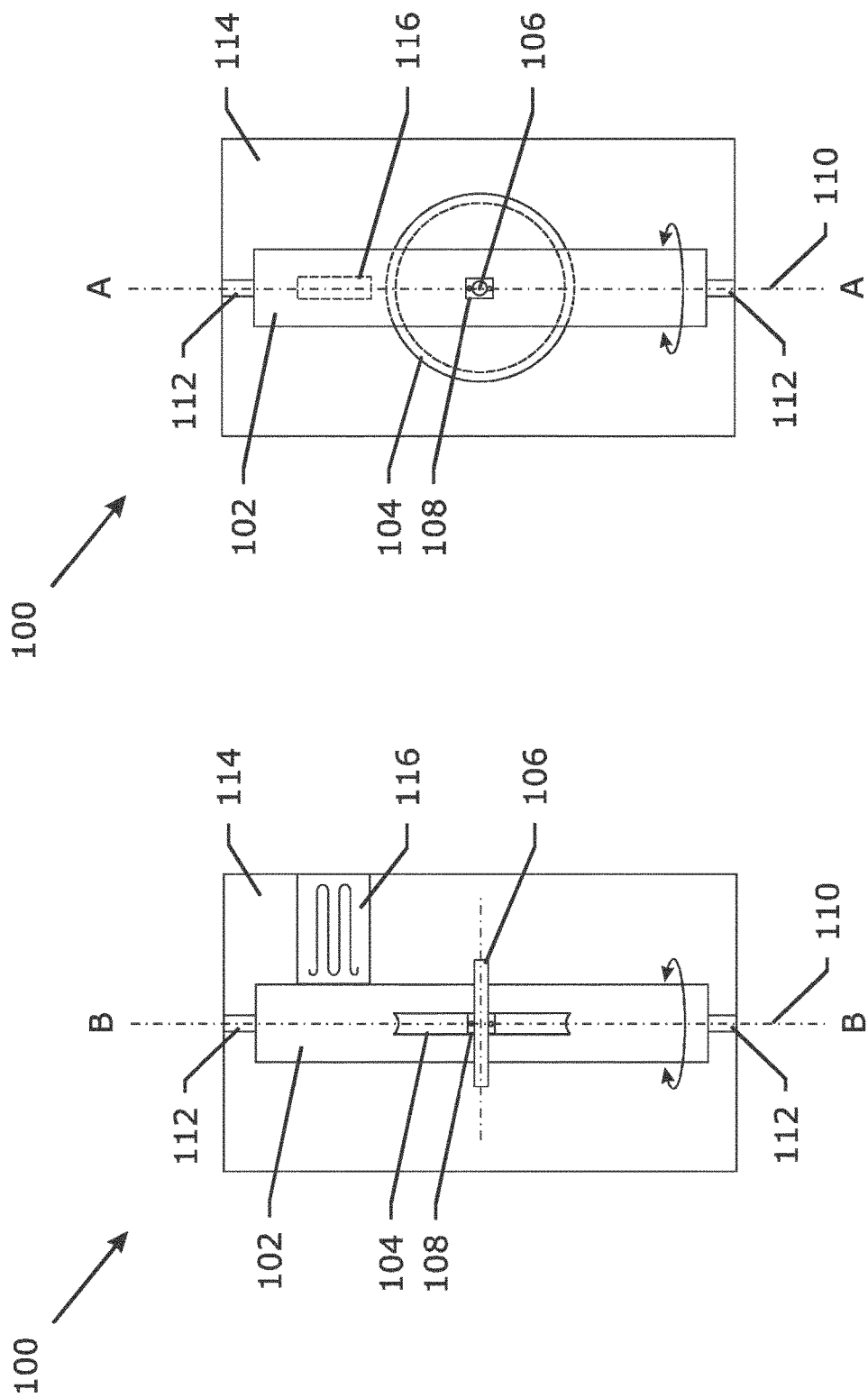

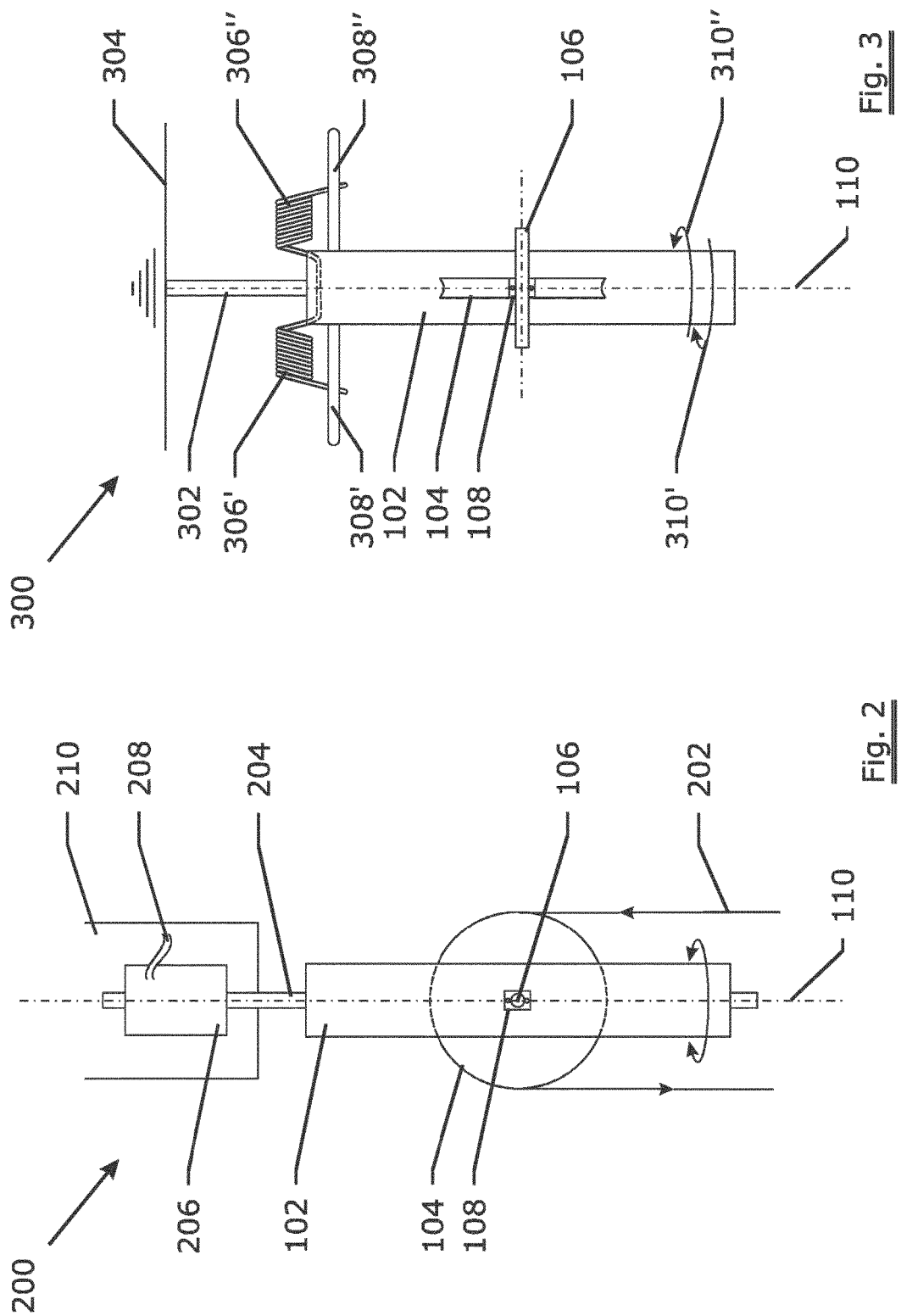

APPARATUS AND METHOD FOR MEASURING RESIDUAL TORSIONS ON AN ELONGATED ELEMENT

TECHNICAL FIELD

The invention relates to an apparatus and method for measuring residual torsions on an elongated element such as a steel cord.

BACKGROUND ART

Residual torsions on an elongated element such as a steel cord must be controlled and thus measured during the manufacture of the elongated element. In the absence of adequate control, the downstream processing of the elongated elements such as the integration of steel cords into rubber plies may become difficult or even problematic. Indeed, uncontrolled residual torsions of steel cords may give rise to tip rise of rubber sheets reinforced with those steel cords. The automatic handling of those rubber sheets may fail as a result of this tip rise.

The prior art discloses several embodiments to measure residual torsions.

U.S. Pat. No. 4,642,979 discloses a way of adjusting the lay of a wire rope by measuring the remaining or residual torque in the wire rope. After the twisting of the wire rope, the wire rope is running in a U-portion over a wheel or dancer roller. This dancer roller is pivotally mounted. The angle of rotation of the dancer roller is measured in order to have an indication about the remaining torque on the wire rope.

This method of measuring residual torsions by measuring the rotation angle of a dancer roller that may pivot more or less freely, although widely used in practice, has several disadvantages.

When allowing the dancer roller to rotate freely, one starts to influence the parameter one want to measure, namely the free rotation starts to reduce already the number of residual torsions.

In addition, the measurement shows some hysteresis behaviour.

Moreover, practice has shown that it is difficult to cover the full range of residual torsions, despite the possibility for almost free rotation.

DISCLOSURE OF INVENTION

It is an object of the invention to avoid or at least to mitigate the drawbacks of the prior art.

It is a further object of the invention to provide simple means to measure residual torsions.

It is another object of the invention to provide measurement means that are more accurate.

It is still another object of the invention to provide measurement of residual torsions over the whole range.

Yet another object of the invention is to increase the range of residual torsions that may be measured.

According to a first aspect of the invention, there is provided an apparatus for measuring residual torsions of an elongated structure such as a steel cord. The apparatus comprises a pivot head. The pivot head comprises a wheel adapted to guide an elongated structure. This wheel is mounted in the pivot head so as to transmit torques exercised by the elongated structure on the wheel to the pivot head.

The pivot head is mounted along a pivotal axis in the apparatus. The pivotal axis of the pivot head lies in a plane of the wheel and comprises the centre of the wheel.

The apparatus further comprises sensor means for measuring torque on the pivot head caused by the elongated structure.

The pivotal movement of the torsion head around the pivotal axis is limited to an angle range of ±5°, preferably to ±3°, most preferably limited to an angle range of ±2°.

The terms 'elongated member' not only refer to a steel cord but also to other twisted or untwisted structures such as a metal strand, a wire rope, a twisted single wire, . . . .

By reducing the amplitude range of rotation of the pivot head to a very small range, the negative influence of the rotation itself on the residual torsion measurement is also reduced to a very small portion.

The reduced amplitude range also facilitates the covering of the whole range of residual torsions and, as will be explained hereinafter, even enlarges the range of residual torsions that can be measured.

One of the preferred embodiments is to have a 0° rotation of the pivot head.

The amplitude of rotation of the pivot head may be reduced by integrating into the mechanical chain from wheel to frame a stiff element such as a stiff torsion spring and/or a stiff load cell of the sensor means itself. Following Hooke's law, these stiff elements translate a great torque into a small displacement.

An additional advantage of using very stiff elements is that—next to a more accurate measurement—the measurable torque range, and thus the measurable range of residual torsions, may be increased as well.

The sensor means preferably have a torque range of ±50 N·mm with an accuracy of 0.5% over the full torque range. Most preferably, the sensor means have a torque range of ±10 N·mm with an accuracy of 0.5% over the full torque range.

With this type of sensors a high accuracy is reached over a torque range which covers the whole range of residual torsions met in practice.

The sensor means preferably measure torque directly by measuring torque or force.

In one embodiment of the invention, the sensor means may comprise a strain gauge or strain gauges as load cell.

In another embodiment of the invention, the sensor means may comprise a torsion spring, e.g. a double torsion spring, as load cell.

The sensor means may also measure torque indirectly by measuring distance, position or angle.

Most preferably the sensor means is pre-calibrated in order to directly show measurement results in number of residual torsions per unit of length.

By calibrating the sensor means in advance per cord construction and prior to install the sensor means in production, calibration in situ can be prevented or at least reduced to a minimum.

According to a second aspect of the invention, there is provided a method for measuring residual torsions on an elongated member such as a steel cord. The method comprises the following steps:
 a) mounting a wheel in a pivot head so that any torques exercised on the wheel are transmitted to said pivot head;
 b) mounting the pivot head along a pivotal axis in a frame, where the pivotal axis lies in a plane of the wheel and comprises the centre of the wheel;
 c) guiding an elongated member over the wheel;

d) measuring torque generated by the elongated member on the wheel and pivot head thereby limiting the pivotal movement of the pivot head to ±5°, preferably to ±3°.

Preferably step d) is carried out by sensor means having a torque range of ±50 N·mm with an accuracy of 0.5% over the full torque range, most preferably by sensor means having a torque range of ±10 N·mm with an accuracy of 0.5% over the full range.

BRIEF DESCRIPTION OF FIGURES IN THE DRAWINGS

FIG. 1a and FIG. 1b show a first embodiment of an apparatus for measuring residual torsions according to the invention.

FIG. 2 shows a second embodiment of an apparatus for measuring residual torsions according to the invention.

FIG. 3 shows a third embodiment of an apparatus for measuring residual torsions according to the invention.

MODE(S) FOR CARRYING OUT THE INVENTION

FIGS. 1a, 1b and FIG. 2 illustrate ways of direct measurement of the torque.

FIG. 1a is a cross-section of a first embodiment of an apparatus 100 for measuring residual torsions according to plane AA of FIG. 1b. FIG. 1b is a cross-section of this apparatus 100 according to plane BB of FIG. 1a.

Apparatus 100 has a pivot head 102. A wheel or pulley 104 is mounted in this pivot head 102 on an axle 106 via a bearing 108. The wheel 104 can rotate freely around the axle 106. The axle 106 is fixed on the pivot head 102. The pivot head 102 together with the wheel 104 is rotatably mounted along a pivot axis 110. Thereto pivot head 102 is mounted via suspension springs 112 in a frame 114. The suspension springs 112 are preferably rather flexible springs with a relatively low spring constant to allow rotating the pivot head 102 as freely as possible. The suspension springs 112 may be formed by a thin steel wire. The mechanical chain from pivot head 102 to frame 114 also comprises stiff elements in the form of strain gauges 116, which may be of a commercially existing type or may be specifically designed for the apparatus. These stiff elements take up the major part of the torque and limit the rotation of the pivot head 102 to ±3°, preferably to ±2°. Preferably strain gauges 116 are selected with a high accuracy and high gauge factor, which is an example of a sensor that measures torque.

Alternatively, stiff suspension springs 112 with a high spring constant may be used and put in series with the strain gauges 116. Relatively thick wires may form these stiff suspension springs 112. In contrast to FIG. 1a, a mechanical link is made between one of the suspension springs and the strain gauges 116. This embodiment has the advantage that the whole torque range is not taken up by the strain gauges only.

Still another alternative is to use the same set up as FIG. 1a with a type of parallel arrangement between the suspension springs 112 and the strain gauges 116. The alternative lies in the use of stiff suspension springs 112 instead of flexible suspension springs. The ratio of torque taken up by the suspension springs 112 to the torque taken up by the strain gauges 116 is calibrated.

FIG. 2 shows yet another apparatus 200 for measuring residual torsions on an elongated member 202.

A steel cord 202 makes a type of U-form around a wheel 104 that is connected to a pivot head 102. Pivot head 102 is rotatably mounted along pivot axis 110.

Pivot head 102 is connected by means of a stiff suspension spring 204 to a static torque sensor 206, which is an example of a sensor that measures torque. The static torque sensor 206 may be of a commercially existing type or may be specifically designed for the apparatus. Such a torque sensor may comprise strain gauges inside that are mechanically connected to the torsion bar. Any torque exercised by the suspension spring 204 deforms the torsion bar and, as it does so, also elastically and reversibly deforms the strain gauges that are fitted to the torsion bar. The changes of electrical resistance of the strain gauges are proportional to the deformation of the strain gauges.

Preferably the torque sensor may have four strain gauges. A multiple of four strain gauges may also be used. These strain gauges are arranged as a Wheatstone bridge circuit and are supplied with DC voltage or with AC voltage or with AC current by the sensor via connection 208. The output voltage from the strain gauges is proportional to the measured torque. The use of AC allows elimination of the thermal offset and thermocouple effects in the system. Static torque sensor 206 may be housed in a frame 210.

FIG. 3 illustrates a way of indirect measurement of the torque on pivot head 102.

Pivot head 102 with wheel 104 is rotatably hung by means of a suspension spring 302 to a frame 304. The mechanical chain between pivot head 102 and frame 304 comprises a double torsion spring 306', 306". In case the torsion constant of the double torsion spring 306', 306" is high, the torsion constant of the suspension spring 302 may be somewhat lower. In case the torsion constant of the double torsion spring 306', 306" is low, the torsion constant of the suspension spring 302 is higher. The total mechanical chain must be stiff enough to limit the rotation of the pivot head 102 to ±3°.

Preferably the suspension spring 302 is flexible and the double torsion spring 306', 306" stiff so that the main part of the torque is taken up by the double torsion spring 306', 306".

A left arm 308' and a right arm 308" are connected to the pivot head 302. In case pivot head 302 rotates in the direction of arrow 310', left arm 308' moves a little bit the trailing end of the left part 306' of the double torsion spring.

In case pivot head 302 rotates in the direction of arrow 310", right arm 308" moves a little bit the trailing end of the right part 306" of the double torsion spring.

The degree of displacement of the trailing ends of the double torsion spring 306', 306" or the amount of displacement of the arms 308', 308" is proportional to the torque exercised on the wheel 104 and to the amount of residual torsions present on the elongated member.

LIST OF REFERENCE NUMBERS 100 first embodiment of measurement apparatus
102 pivot head
104 wheel or pulley
106 axle
108 bearing
110 pivot axis
112 suspension spring
114 frame
116 strain gauge
200 second embodiment of measurement apparatus
202 elongated member 204 suspension spring
206 torque sensor
208 connection cable
210 frame
300 third embodiment of measurement apparatus
302 suspension spring
304 frame
306' left part of double torsion spring
306" right part of double torsion spring
308' left part of arm
308" right part of arm
310' direction of rotation where left part of double torsion spring is touched
310" direction of rotation where right part of double torsion spring is touched

The invention claimed is:

1. An apparatus for measuring residual torsions of an elongated structure,
said apparatus comprising a pivot head,
said pivot head comprising a wheel adapted to guide the elongated structure,
said wheel mounted in said pivot head so as to transmit torques exercised by said elongated structure on said wheel to said pivot head,
said pivot head being mounted along a pivotal axis in said apparatus,
said pivotal axis lying in a plane of said wheel and comprising the centre of said wheel,
said apparatus further comprising a sensor that measures torque on said pivot head caused by said elongated structure,
wherein pivotal movement of said pivot head around said pivotal axis is limited to an angle range of ±5° by integrating a stiff element in a mechanical chain from said wheel to a frame.

2. The apparatus according to claim 1, wherein said sensor has a torque range of ±10 N·mm with an accuracy of 0.5% over the full torque range.

3. The apparatus according to claim 1, wherein said sensor measures torque directly by measuring either a torque or a force.

4. The apparatus according to claim 3, wherein said sensor comprises a strain gauge.

5. The apparatus according to claim 3, wherein said sensor comprises a torsion spring.

6. The apparatus according to claim 5, wherein said torsion spring is a double torsion spring.

7. The apparatus according to claim 1, wherein said sensor measures torque indirectly by measuring angle or position.

8. The apparatus according to claim 1, wherein said sensor has been pre-calibrated to directly show measurement results in residual torsions per unit of length.

9. The apparatus according to claim 1, wherein the elongated structure is a steel cord.

10. The apparatus according to claim 1, wherein pivotal movement of said pivot head around said pivotal axis is limited to an angle range of ±3°.

11. The apparatus according to claim 1, wherein said sensor has a torque range of ±50 N·mm with an accuracy of 0.5% over the full torque range.

12. A method for measuring residual torsions on an elongated member, said method comprising the following steps:
a. mounting a wheel in a pivot head so that any torques exercised on said wheel are transmitted to said pivot head;
b. mounting said pivot head along a pivotal axis in a frame, said pivotal axis lying in a plane of said wheel and comprising the centre of said wheel;
c. guiding the elongated member over said wheel;
d. integrating a stiff element in a mechanical chain from said wheel to a frame;
e. measuring torque generated by said elongated member on said wheel and pivot head thereby limiting pivotal movement of said pivot head to ±5°.

13. The method according to claim 12, wherein the elongated structure is a steel cord.

14. The method according to claim 12, wherein step e. comprises measuring torque generated by said elongated member on said wheel and pivot head thereby limiting pivotal movement of said pivot head to ±3°.

15. The method according to claim 12, wherein step e. is carried out by a sensor that has a torque range of ±50 N·mm with an accuracy of 0.5% over the full torque range.

* * * * *